United States Patent
Emerson (10) Patent No.: US 8,958,539 B2
(45) Date of Patent: Feb. 17, 2015

(54) SYSTEM AND METHOD FOR NETWORK BASED CALL TRANSFERS

(75) Inventor: David E. Emerson, Overland Park, KS (US)

(73) Assignee: CenturyLink Intellectual Property LLC, Denver, CO (US)

(*) Notice: Subject to any disclaimer, the term of this patent is extended or adjusted under 35 U.S.C. 154(b) by 1484 days.

(21) Appl. No.: 12/107,892

(22) Filed: Apr. 23, 2008

(65) Prior Publication Data

US 2009/0268895 A1 Oct. 29, 2009

(51) Int. Cl.
*H04M 3/42* (2006.01)
*H04M 3/54* (2006.01)
*H04M 3/58* (2006.01)

(52) U.S. Cl.
CPC . *H04M 3/54* (2013.01); *H04M 3/58* (2013.01); *H04M 2207/20* (2013.01)
USPC ............. 379/212.01; 379/211.01; 379/211.02

(58) Field of Classification Search
CPC ............... H04M 3/58; H04M 3/436; H04M 2203/2011; H04M 3/54; H04M 1/006
USPC ............. 379/212.01, 211.01, 211.02, 215.01, 379/201.01
See application file for complete search history.

(56) References Cited

U.S. PATENT DOCUMENTS

| | | |
|---|---|---|
| 5,559,859 A | 9/1996 | Dai et al. |
| 5,619,556 A | 4/1997 | Richardson et al. |
| 6,363,248 B1 | 3/2002 | Silverman |
| 6,545,589 B1 | 4/2003 | Fuller et al. |
| 6,584,316 B1 | 6/2003 | Akhteruzzaman et al. |
| 6,853,718 B1 * | 2/2005 | Bedingfield et al. ..... 379/212.01 |
| 6,856,806 B1 | 2/2005 | Bosik et al. |
| 6,975,874 B1 | 12/2005 | Bates et al. |
| 6,999,757 B2 | 2/2006 | Bates et al. |
| 7,082,192 B2 | 7/2006 | Weaver |
| 7,103,366 B2 | 9/2006 | Bates et al. |
| 7,130,643 B2 | 10/2006 | Bates et al. |
| 7,251,494 B2 | 7/2007 | Bates et al. |
| 7,443,972 B1 * | 10/2008 | Barlow et al. ............ 379/212.01 |
| 7,965,829 B2 * | 6/2011 | Crockett et al. ......... 379/211.02 |
| 8,428,242 B2 | 4/2013 | Emerson et al. |
| 8,718,259 B2 | 5/2014 | Emerson et al. |
| 2004/0170268 A1 | 9/2004 | Hakusui |
| 2004/0234056 A1 | 11/2004 | Heilmann et al. |
| 2005/0096023 A1 | 5/2005 | Moore |
| 2006/0077957 A1 | 4/2006 | Reddy et al. |
| 2006/0252444 A1 | 11/2006 | Ozugur |
| 2007/0041550 A1 | 2/2007 | McLarty et al. |
| 2007/0154005 A1 | 7/2007 | Daigle |

(Continued)

OTHER PUBLICATIONS

U.S. Appl. No. 12/004,804; Final Rejection dated Oct. 18, 2011; 11 pages.

(Continued)

*Primary Examiner* — Nafiz E Hoque
(74) *Attorney, Agent, or Firm* — Swanson & Bratschun, L.L.C.

(57) ABSTRACT

A system and method for transferring calls between multiple devices. A call is communicated through a network device to a first phone utilizing a first communications service. The call is transferred from the first phone to a second phone. The call being transferred in response to a user selection associated with the second phone. The call is transferred from the second phone to a third phone. The second phone or the third phone utilizes a second communications service. The call being transferred in response to a user selection associated with the third phone.

16 Claims, 7 Drawing Sheets

(56) References Cited

U.S. PATENT DOCUMENTS

| | | | |
|---|---|---|---|
| 2008/0064375 A1 | 3/2008 | Gottlieb |
| 2008/0081638 A1 | 4/2008 | Boland et al. |
| 2008/0192655 A1 | 8/2008 | Vagelos |
| 2008/0259918 A1 | 10/2008 | Walker et al. |
| 2008/0317234 A1 | 12/2008 | Di Fabbrizio et al. |
| 2009/0161855 A1 | 6/2009 | Emerson et al. |
| 2009/0323919 A1 | 12/2009 | Toner et al. |
| 2010/0009665 A1 | 1/2010 | Hawkins et al. |
| 2010/0240343 A1 | 9/2010 | Russell |
| 2013/0225143 A1 | 8/2013 | Emerson et al. |

OTHER PUBLICATIONS

U.S. Appl. No. 12/004,804; Non-Final Rejection dated Apr. 27, 2011; 13 pages.

U.S. Appl. No. 12/172,772; Final Office Action dated Mar. 12, 2012; 13 pages.

U.S. Appl. No. 12/172,772; Non-Final Office Action dated Mar. 31, 2011; 12 pages.

U.S. Appl. No. 12/146,118; Notice of Allowance dated Jan. 9, 2012; 7 pages.

U.S. Appl. No. 12/146,118; Non-Final Rejection dated Sep. 14, 2011; 6 pages.

U.S. Appl. No. 12/004,804; Notice of Allowance dated Dec. 24, 2012; 14 pages.

U.S. Appl. No. 12/004,804; Issue Notification dated Apr. 3, 2013; 1 page.

U.S. Patent Application No. 020370-009300US; Non-Final Office Action dated Nov. 7, 2013; 18 pages.

U.S. Patent Application No. 020370-009300US; Notice of Allowance dated Dec. 23, 2013; 15 pages.

U.S. Appl. No. 13/850,029; Issue Notification dated Apr. 16, 2014; 1 page.

* cited by examiner

| | | Graphical User Interface | | 700 |
|---|---|---|---|---|
| 702 | Username | Demer | | |
| 704 | Password | ******** | | |

| 706 | 707 | 708 | | |
|---|---|---|---|---|
| Call Transfer Codes | Voice Transfer Codes | Call Transfer Numbers | | |
| *75 | 1 (One) | [C] | 214-998-9998 | Cell |
| *76 | 2 (Two) | [W] | 128.13.3.4859 | Work |
| *77 | 7 (Seven) | [P] | 214-999-9997 | Home |
| | 6 (Six) | [T] | 212-555-9966 | Mary's Cell |

✓ Add voice transfer ▼
5 (five)   [V]   713-555-7755  Lake House    710

US 8,958,539 B2

SYSTEM AND METHOD FOR NETWORK BASED CALL TRANSFERS

BACKGROUND OF THE INVENTION

Description of the Related Art

The use of and development of communications has grown nearly exponentially in recent years. The growth is fueled by larger networks with more reliable protocols and better communications hardware available to service providers and consumers. In order to effectively communicate, many users utilize different communications services at home and on the go. The most useful service and device may vary based on the user's situation and circumstances. For example, when at home, a cordless phone utilizing a voice over Internet Protocol or plain old telephone service may be most convenient. When traveling a user may feel that a cellular phone or Blackberry is most efficient.

Based on changing circumstances, a user may transfer a call from one device and/or service to another. Unfortunately, most transfer features limit a user to a single transfer or to transfer between devices or services provided by a single communications service provider.

BRIEF SUMMARY OF THE INVENTION

One embodiment provides a system and method for transferring calls between multiple devices. A call may be communicated through a network device to a first phone utilizing a first communications service. The call may be transferred from the first phone to a second phone. The call may be transferred in response to a user selection associated with the second phone. The call may be transferred from the second phone to a third phone. The second phone or the third phone may utilize a second communications service. The call may be transferred in response to a user selection associated with the third phone.

Another embodiment includes a network device for transferring calls between devices using one or more communications service providers. The network device may include call transfer logic operable to store a number of user preferences for transferring calls. The call transfer logic may receive a user selection associated with a call transfer option for initiating a call transfer in response to presenting the user preferences to a user. The network device may include a switch in communication with the call transfer logic. The switch may be operable to reconfigure a portion of a call path, from the switch to a first phone, from the switch to a second phone. The call path may be reconfigured in response to the user selection. The user selection may be associated with the second phone.

Yet another embodiment includes a networking device for transferring calls between multiple devices. The network device may include a processor for executing a set of instructions and a memory for storing the set of instructions. The set of instructions may be configured to communicate a call through to a first phone utilizing a first communications service, receive a general transfer command in response to a selection of a user, communicate call transfer options to the user the call transfer options being previously set by the user, and transfer the call from the first phone to one or more phones using a second communications service in response to a second selection of the user associated with the one or more phones.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Illustrative embodiments provide a system, method, and network device for transferring a call between multiple devices across different communications service providers. In one embodiment, a user may provide users preferences specifying how calls may be transferred between devices based on transfer commands selected or entered by the user. The transfer preferences may include dedicated transfer commands that are linked with calling information for each of the applicable devices. The calling information may include phone numbers, Internet Protocol addresses, usernames, or other dialing and call connection information.

Figure 1:
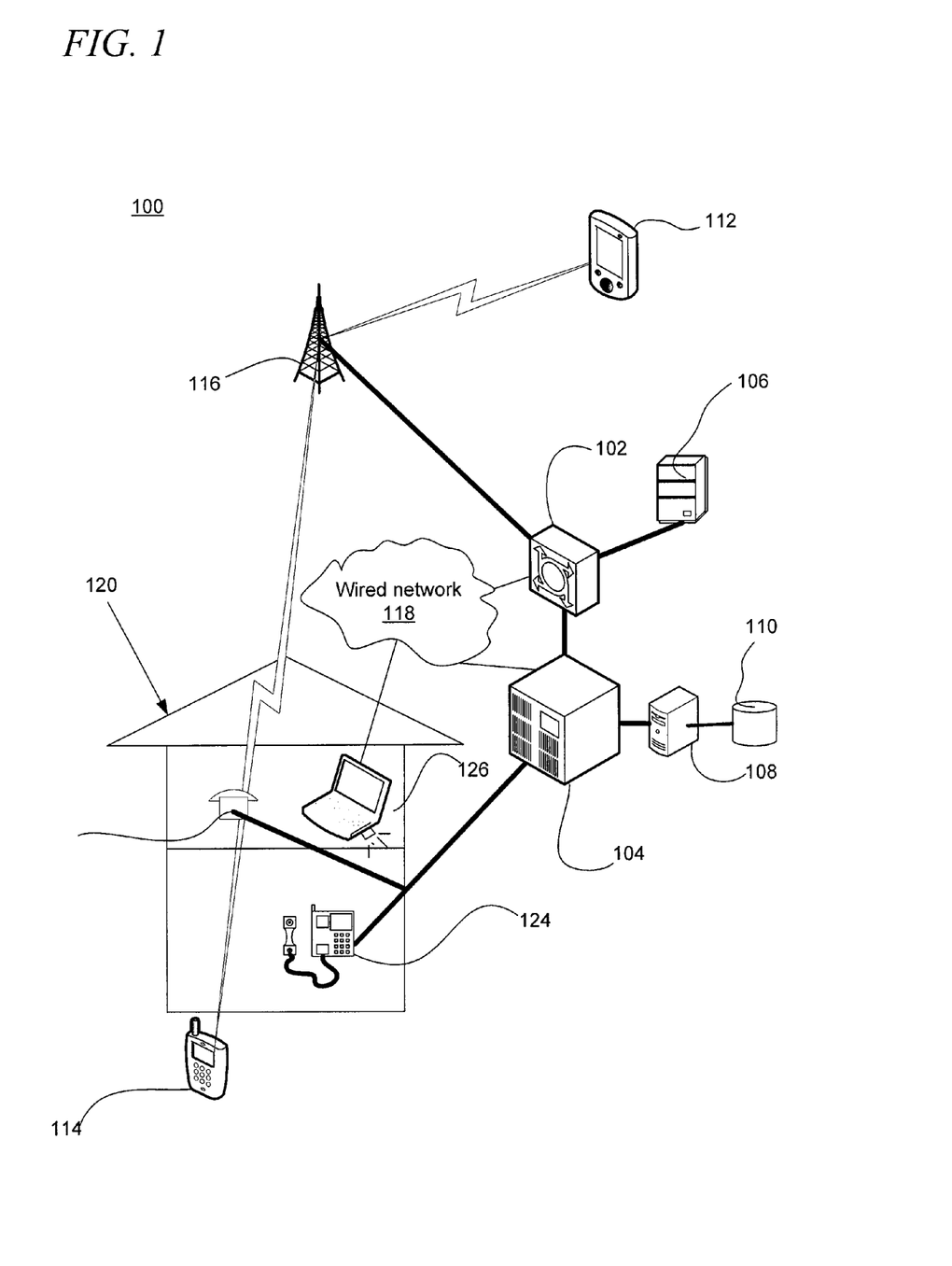
FIG. 1 is a pictorial representation of a communications environment in accordance with an illustrative embodiment.

FIG. 1 is a pictorial representation of a communications system in accordance with an illustrative embodiment. The communications environment 100 of FIG. 1 includes various elements used for wireless and wired communication. The communications system 100 includes a mobile switching center (MSC) 102, a local exchange 104, voicemail systems 106 and 108, a database 110, wireless devices 112 and 114, a transmission tower 116, a wired network 118, a home 120, home telephones 122 and 124, and a client 126. The different elements and components of the communications system 100 may communicate using wireless communications including satellite connections and/or hardwired connections, such as fiber optics, T1, cable, DSL, high speed trunks, and telephone lines.

The wireless devices 112 and 114 may communicate with the transmission tower 116 using communications protocols, such as time division multiple access (TDMA), code division multiple access (CDMA), global systems for mobile (GSM) communications, personal communications systems (PCS), WLAN, WiMAX, or other frequently used cellular and data communications protocols and standards. The wireless devices 112 and 114 may include cellular phones, Blackberry® devices, personal digital assistances (PDA), mp3 players, laptops, evolution data optimized (EDO) cards, multi-mode devices, and other wireless communication devices and elements.

Communications within the communications system 100 may occur on any number of networks which may include wireless networks, data or packet networks, cable networks, satellite networks, private networks, publicly switched telephone networks (PSTN), the wired network 118, or other types of communication networks. The networks of the communications system 100 may represent a single communication service provider or multiple communications services providers. The features, services, and processes of the illustrative embodiments may be implemented by one or more elements of the communications system 100 independently or as a networked implementation.

In one embodiment, the MSC 102, voicemail system 106, and transmission tower 116 are part of a wireless network that is operated by a wireless service provider. For example, the control signals and operational features may be performed by the MSC 102 and the wireless signals may be broadcast from the transmission tower 116 to the wireless devices 112 and 114. The wireless network may include any number of systems, towers, servers, and other network and communications devices for implementing the features and performing the methods herein described. The wireless network may enable cellular, data, radio, television service, or other wireless schemes. For example, the transmission tower 116 may transmit signals to cell phones, Blackberry devices, car radios, and high definition televisions.

The MSC 102 may be a switch used for wireless call control and processing. The MSC 102 may also serve as a point of access to the local exchange 104. The MSC 102 is a telephone exchange that provides circuit switched calling and mobility management and may also provide GSM or PCS services to the wireless devices 112 and 114 located within the area the MSC 102 serves. The MSC 102 may include a home location register (HLR) and visitor location register (VLR) that may be used to implement different features of the illustrative embodiments. The voicemail system 106 may be an integrated part of the MSC 102 or alternatively may be an externally connected device.

In one embodiment, the voicemail system 106 may include an integrated database for storing customer and usage information, electronic profiles, and data. In another embodiment, a server, intelligent transfer device, call management system, or other intelligent network device may store call transfer information, transfer preferences, and transfer commands, as further described herein. The user may communicate, interact, or send and receive data, information, and commands to the server through the telephones 122 and 124, wireless device 112 and 114, or the client 126. The MSC 102 and voicemail system 106 may include any number of hardware and software components. In one embodiment, the MSC 106 is an advanced intelligence network device with software modules equipped to implement the call transfer feature between multiple devices using different communications service providers.

The local exchange 104, the MSC 102, and/or other elements of the communications system 100 may communicate using a signal control protocol, such as a signaling system number 7 (SS7) protocol or TCP/IP protocols. The SS7 protocol or similar protocols are used in publicly switched networks for establishing connections between switches, performing out-of-band signaling in support of the call-establishment, billing, routing, and implementing information-exchange functions of a publicly switched network or the wired network 118. The local exchange 104 may be owned and operated by a local exchange carrier that provides standard telephone service to any number of users. In one embodiment, the local exchange 104 may be a class 5 switch that is part of the network systems of the local carrier. The local exchange 104 may include or may be connected to the voicemail system 106. However, the local exchange 104 may also be a Digital Subscriber Line Access Multiplexer (DSLAM), Internet Protocol (IP) gateway, base station, or any other suitable network access point.

The local exchange 104 may be a wire-line switch or public exchange using time domain multiplexing to provide telecommunications services to a particular subscriber or groups of subscribers. The local exchange 104 may be located at a local telephone company's central office, or at a business location serving as a private branch exchange. The local exchange 104 may provide dial-tone, calling features, such as multiple device/provider call transfer, and additional digital and data services to subscribers, such as home phones 122 and 124. The local exchange 104 may also enable voice over internet protocol (VoIP) communication of the home telephones 116 and 118 through a data network. VoIP works by sending voice information in digital form, such as packets, rather than using the traditional circuit-committed protocols of the publicly switched network. The local exchange 104 may be or include a feature server, a call control agent, or an IP gateway for implementing VoIP communications.

The communications system 100 may further include any number of hardware and software elements that may not be shown in the example of FIG. 1. For example, in order to facilitate VoIP communications, the communications system and the MSC 102 and local exchange 104 in particular, may include additional application servers, media servers, service brokers, call agents, edge routers, gateways (signaling, trunking, access, sub, etc.), IP network service providers, adapters, exchanges, switches, users, and networks. The voicemail system 108 is similar to the voicemail system 106 except that it is equipped to handle voicemail for landline customers rather than wireless customers. The local exchange 104 or other networked components of a wire line network, such as a data, PSTN, VoIP, or other wired network may implement the features and perform the methods herein described.

The MSC 102 and the local exchange 104 may include an authentication space. The authentication space may be a partition, module, or other storage or memory of the server designated by the communications service provider. The authentication space may validate that a user or device, such as client 126, is allowed to authorize the MSC 102, local exchange 104, servers, switches, network devices, or corresponding voicemail systems 106 and 108 to set preferences, implement changes, review information, or perform other updates. For example, a user may first be required to provide a secure identifier, such as a user name, password, or other authentication code or hardware interface, to verify the user is authorized to make changes within the authentication space.

The authentication information may also be used to create a secure connection between the client and the MSC 102, a server, or the local exchange 104. The secure connection may be a virtual private network tunnel, an encrypted connection, firewall, or other form of secured communications link. The MSC 102 and local exchange 104 may use any number of gateways, proxies, applications, or interfaces for allowing the client 126 to communicate with the MSC 102 and local exchange 104 through the wired network 118. Alternatively, the client 126 may use a wireless network or other network to access the MSC 102 and local exchange 104. The MSC 102 and local exchange 104 may use a host client application for communicating with numerous clients.

The home 120 is an example of a dwelling, residence, or location of a person or group that may utilize any number of communications services. The home 120 is shown as a residence in the illustrated example, however, the home 120 may also be an office, business, or other structure wired or otherwise suitably equipped to provide telephone, data, and other communication services to one or more customers. In one embodiment, the home 120 is equipped with multiple communication devices, including home telephones 122 and 124 and client 126. The home telephones 122 and 124 may be standard devices that provide dialing and voice conversation capabilities. Home telephone 122 may be integrated in any number of other devices or may be used in different forms. For example, the home telephone 122 may be part of a refrigerator or intercom system. In another embodiment, the home telephone 124 may be integrated with a personal computer, such as client 126. Calls may be transferred between any of the telephones illustrated in the communications environment based on a pre-configured selections and commands of a user or business. Additionally, any number of other voice communication devices, programs, and elements may similarly be utilized to transfer voice calls.

The communications services accessible from the home telephones 122 and 124 may include standard telephone service or VoIP telephone service. The home telephones 122 and 124 may be VoIP telephones or may be standard telephones that include a modem and/or VoIP adapters for enabling VoIP communications. A special dial tone, message, web alert, or other feedback may specify once or repeatedly that the home telephones 116 and 118 are implementing a particular feature. For example, the home telephones 116 and 118 may sound a double chirp indicating a call is being placed on hold so that the call may be transferred to another device based on a transfer command or other user selection. The user may subsequently transfer the call back to the same telephonic device or to another selected telephone by entering another transfer command.

The client 126 may be a personal computer for performing and executing programs and instructions and accessing the wired network 118. However, the client 126 may be any computing devices suitable for communicating with the wired network 118 through a network connection. The wired network 118 may be a fiber optic, cable, or telephone network or other wired network suitable for communication over a hard wired connection with the client 126. In one embodiment, the home 120 may include a wireless router, adapter, switch, hub, or other suitable interface that allows the client 126 to communicate with the wired network 118. Alternatively, the client 126 may communicate with the wired network 118 through a wireless connection. The MSC 102 and local exchange 104 may use a graphical user interface (GUI), such as website or program accessible from the client 126 in order to enter and receive transfer preferences and transfer commands associated with one or more telephonic devices.

At any time, a user may select to enable, order, initiate, implement, or otherwise request the features herein described. For example, the user may use a command that informs a function trigger of a device or the device itself, such as the MSC 102, local exchange 104, voicemail systems 105 and 106, wireless device 112 and 114, home telephones 122 and 124, or client 126, to transfer a call based on a transfer command linked with a specified telephone. In one example, the user may submit a command to activate the transfer of a call to a wireless phone by dialing *23 on the home telephone 122. In one embodiment, the user may be required to enter a pass code, account code, password, pin number, or other identifier before utilizing the transfer feature. In another embodiment, a user may subsequently transfer the call from the wireless phone enabled to communicate via a separate wireless service provider to a home phone enabled for plain old telephone system (POTS) communication by dialing *24 on a separate wireless device The command may also be a password, voice activated, time activated, preset by user selection or any other suitable option, setting, command, or user input. In another embodiment, the various features may be implemented using tactile commands.

Figure 2:
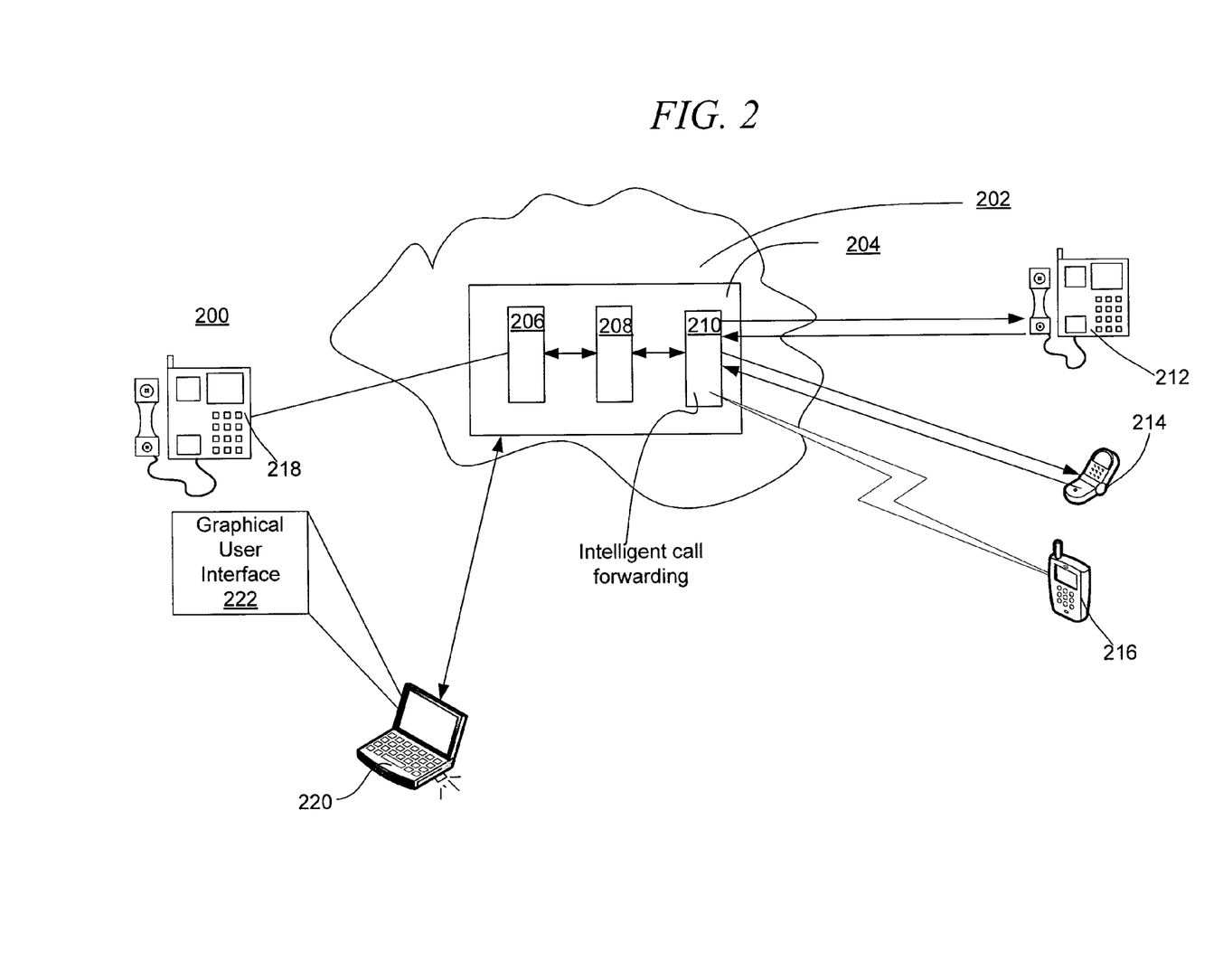
FIG. 2 is a pictorial representation of a communications system in accordance with an illustrative embodiment.

FIG. 2 is a pictorial representation of a communications system in accordance with an illustrative embodiment. The communication system 200 is a particular implementation of aspects of the communications environment 100 of FIG. 1. The communication system may include communications network 202, communications management system 204, network devices 206, 208, and 210, user phones 212, 214, and 216, caller phone 218, client 220, and GUI 222.

In one embodiment, the communications network 202 is a communications network enabling wireless, data, packet, and other forms of communications as previously described in FIG. 1. In one embodiment, the communications network 202 may be implemented by a single communications service provider operating the communications management system 204. The communications management system 204 is a system of devices, communications lines, and other components that coordinate communications throughout the communications network 202. The communications management system 204 may coordinate traffic, route calls, and otherwise provide statistics and management information to any number of individuals or devices acting as network administrators. The network devices 206, 208, and 210 are the routers, switches, servers, call transfer devices, and other intelligent network devices for both routing, communications, and managing the call transfer features and services as herein described.

When a call is made between the caller 218 and any of the user phones 212, 214, or 216, a call path is established. The call path may include any number of legs, connections, lines, or other communications medium enabling a voice conversation between the caller 218 and one or more the user phones 212, 214, and 216. As illustrated herein, the call path may be divided into different portions or sections. In particular, the call path may include the communications lines, devices, and other elements from the caller 218 to the communications management system 204 and then subsequently, a second portion of the call path or final leg is the lines, connections, or devices necessary to carry the voice communications from the communications management system 204 to any of the user phones 212, 214, and 216. The initial leg and secondary leg are shown as straight lines, but those skilled in the art will understand that the call path may be indirectly routed through any number of devices, networks, service providers, or different communications mediums.

As described herein, a portion of the call path is a portion of the call reconfigured from the applicable network device 210 to a selected phone. In this example, the first portion of the call path is from the caller phone to the network device 210 and the second portion is from the network device 210 to the applicable phone, such as user phone 214. The second portion of the call path is reconfigured based on the location and call path needed to communicate with the other phone.

The caller phone 218 may be a VoIP phone, POTS phone, soft phone, wireless phone, or other telephonic device or software construct enabling voice communications. Similarly, the user phones 212, 214, and 216 may be represented by a VoIP phone, a cellular telephone, and a wireless device enabled for both VoIP communications and traditional wireless communications. In the illustrative embodiments, a user utilizing any of the user phones 212, 214, and 216 may enter a transfer command, user selection, or other input in order to transfer a call between the devices. For example, a call between the caller phone 218 and user phone 212 may be routed and managed through the communications management system 204, and more particularly, the network devices 206, 208, and 210.

The transfer command or user selection is the signal or information from a user specifying a phone to which the call is to be transferred. The user may be presented call transfer options for making the selection. The call transfer options are the available transfer commands that may be utilized to transfer the call to another phone. In particular, the call transfer options may be part of a menu, list, or pre-set configuration of user preferences. The user preferences are the overall configuration of the call transfer feature for the user that associates the call transfer options and transfer commands with one or more phone numbers, IP addresses, usernames, or phones. The user preferences may be pre-established by the user using a graphical user interface so that the call transfer options may be audibly, visually, tactilely, or otherwise presented to the user for receiving a call transfer command or other option. The user may associate the call transfer commands with the applicable phones in the user preferences for impromptu usage of the call transfer feature.

Based on a transfer command, such as *73, the call with the user phone 212 may be temporarily placed on hold by one of the network devices 206, 208, and 210. Subsequently, the final leg of the call path may be reconfigured to transfer the call to the user phone 214 through a newly routed call path. In one embodiment, the transfer command *74 may be associated with the user phone 214 and as a result, the user does not need to provide any additional details or information in order to transfer the call between the user phone 212 and the user phone 214. This feature may allow a user that takes a call from the caller phone 218 on the user phone 212 at home, to subsequently transfer the call to the user phone 214 in order to allow the user to travel to the office. Similarly, once the user arrives at the destination location, the user may enter another transfer command, such as *75 to transfer the call to a work phone, such as the user phone 216. In this example, the call path from the communications management system 204 to the user phone 214 is reconfigured to send a call to the user phone 216. The second part of the call path may be routed through any number of networks, service providers, or other devices in order to reconnect the call to the user phone 216.

The proceeding is one example of how the illustrative embodiments may be utilized to transfer calls. It is not meant as a limitation or a required process that must be utilized in order to enable the various embodiments. It is important to note that the calls, as illustrated between the user phones, 212, 214, and 216, may occur even though the user devices 212, 214, and 216 are enabled through different communications service providers. For example, each of the user phones 212, 214, and 216 may be enabled through a different communications service provider as is often the case in urban areas, where a user's home phone, wireless phone, and work phone are provided through different communications service providers. In another example, a call that was originally connected to the user phone 214 may be transferred to the user phone 212 by dialing *73. Subsequently, the user may transfer the call back to the user phone 214 by dialing *74. As a result, the calls may be transferred based on the changing needs and circumstances of one or more users regardless of the current communications service provider and device. The transfer commands may be linked or otherwise associated with a specified device calling number or other telephonic element. As described in the example of FIG. 2, dialing *73 may transfer an ongoing call to the user phone 212. While similarly a user command of *74 or *75 will transfer the call to the user phone 214 or the user phone 216, respectively.

In another embodiment, the user with access to any of the user phones 212, 214, or 216 may transfer the call to a device that is not associated with the transfer command. For example, by entering a generic hold or transfer command, the user may manually input a phone number, IP address, or user name in order to transfer the call to a specified device or location. In one embodiment, the communications management system 204 may provide call transfer options or user prompts that allow the user to select how and where to transfer the call.

In one embodiment, the communications management system 204 may provide interactive voice response (IVR) system and a voice menu based on preset user selections that indicates call transfer options indicating how calls may be transferred. For example, when the user enters a generic transfer command, such as *99 from the user phone 212, the communications management system 204 may present a voice prompt that says to transfer the call to your cellular phone dial *74. To transfer the call to your mobile phone at work, dial *75. The voice menu may further specify any number of devices that are associated with direct transfer commands. The voice menu may use text-to-voice translation to read the phone identifier, name, or nickname assigned by the user for each of the associated devices. The designated transfer code and the voice command may or may not correspond. For example, the user may select *94 or say eight to transfer the phone to a vacation home. In one embodiment, the designated transfer code and the voice command may be used interchangeably. For example, the user may select 11, *11, or say eleven to transfer a call to a Blackberry phone.

In another embodiment, the transfer command menu may be presented on a screen of the user phones 212, 214, and 216 enabling the user to easily determine where to transfer the call. The transfer commands or user selections may be linked with the user phones 212, 214, and 216 in any number of ways. In one embodiment, the user may associate the call transfer commands with specified devices, numbers, IP addresses, or user names using the user phones 212, 214, and 216 themselves.

In another embodiment, the client 220 and corresponding GUI 222 may be utilized to configure the transfer commands. For example, the communications management system 204 may include a server, such as network device 206 that allows a user to enter transfer preferences through a website portal application or other interfacing element. Regardless of how the user preferences are received, the transfer commands may be stored centrally in the communications management system 204 as well as locally in the user phones 212, 214, and 216 in order to enable quick access to the information.

In one embodiment, the network device 208 is an intelligent call transfer platform or device configured to receive the transfer commands or user selections and reconfigure the second part of the call path from the network device 210 which may be a switch, server, router, or other communications component.

Figure 3:
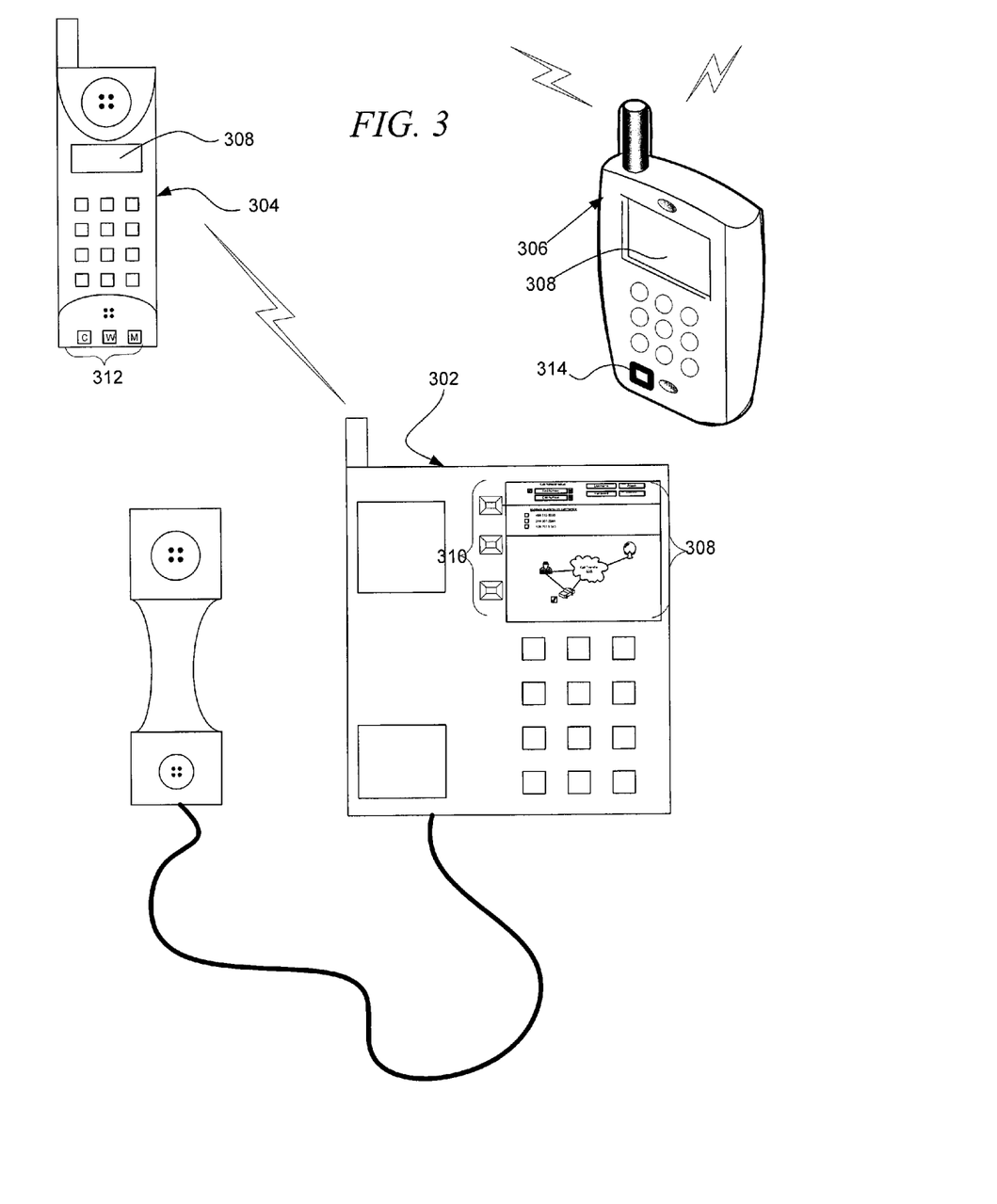
FIG. 3 is a pictorial representation of telephones in accordance with an illustrative embodiment.

FIG. 3 is a pictorial representation of telephones in accordance with an illustrative embodiment. Illustrative embodiments of telephones including VoIP phone 302, handset 304, and cell phone 306 are shown. FIG. 3 also illustrates display 308, soft transfer buttons 310, dedicated transfer buttons 314, and transfer button 312. The VoIP phone 302 and cell phone are a particular implementation of the user phones 212 and 216 of FIG. 2.

As shown, the VoIP phone 302 may include any number of handsets and is not limited to any specific number as illustratively shown in FIG. 2. A user may utilize the VoIP phone 302 and a connected handset or the handset 304 to communicate through the VoIP phone 302. The VoIP phone 302 and handset 304 may communicate using any number of short range wireless signals and protocols that enable the handset 304 for communication in a home, business, or areas in near proximity to the location of the VoIP phone 302.

The VoIP phone 302, the handset 304, and the cell phone 306 may include the display 308. The display 308 is a graphical interface element for displaying information to a user. In one embodiment, the display 308 may display information an receive user input. For example, the display 308 may be a LCD, touch screen, or other interface suitable for displaying text, numbers, data, and other information to the user.

The transfer commands may be entered by voice commands, tactile input, selection indicators, the soft transfer buttons 310, dedicated transfer buttons 314, the transfer button 312, or other interfacing elements of the VoIP phone 302, handset 304, and the cell phone 306. The soft transfer buttons 310 are programmable indicators that may be separate or integrated with the display 308. For example, by selecting one of the soft transfer buttons 310 a call may be placed on hold before being transferred to the cell phone 306. The soft transfer buttons 310 may be programmed to transfer the call based on a user selection and programming.

The dedicated transfer buttons 314 are buttons dedicated for transferring calls between devices. For example, by pressing the first dedicated transfer button 314, the call may be transferred to the cell phone 306. Although the dedicated transfer buttons 314 are specifically intended for competing transfers, user input of a specified phone number, IP address, or username may be required.

Figure 4:
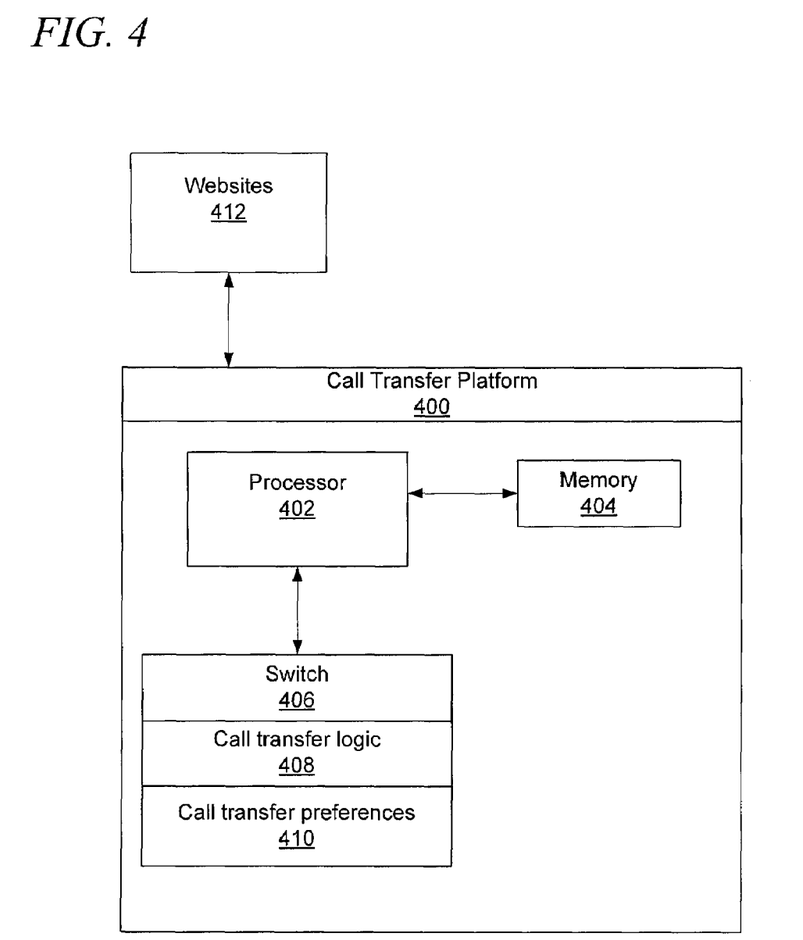
FIG. 4 is a block diagram of a call transfer platform in accordance with an illustrative embodiment.

FIG. 4 is a block diagram of a call transfer platform in accordance with an illustrative embodiment. The call transfer platform 400 is a particular implementation of a platform or network device, such as network device 208 of FIG. 2. The call transfer platform 400 may include a processor 402, a memory 404, a switch 406, call transfer logic 408, call transfer preferences 410 and may communicate with websites 412.

The processor 402 is circuitry or logic enabled to control execution of a set of instructions. The processor 402 may be a microprocessor, digital signal processor, central processing unit, or other device suitable for controlling an electronic device including one or more hardware and software elements, executing software, instructions, programs, and applications, converting and processing signals and information, and performing other related tasks. The processor 402 may be a single chip or integrated with other computing or communications elements.

The memory 404 is a hardware element, device, or recording media configured to store data for subsequent retrieval or access at a later time. The memory 404 may be static or dynamic memory. The memory 404 may include a hard disk, random access memory, cache, removable media drive, mass storage, or configuration suitable as storage for data, instructions, and information. In one embodiment, the memory 404 and processor 402 may be integrated. The memory may use any type of volatile or non-volatile storage techniques and mediums.

The call transfer platform 400 may be implemented in hardware, software, or a combination of both. In one embodiment, the call transfer features may be stored in the memory 404 as a program, logic, or set of instructions for execution by the processor 402. The switch 406, call transfer logic 408, and call transfer preferences 410 may be integrated as part of the memory 404 for execution and performance by the call transfer platform 400. In another embodiment, the switch 406, the call transfer logic 408, and call transfer preferences 410 may be discrete logic, circuits, cards, boards, busses, programmable gates, or other software and hardware constructs utilized to perform the services and features of the call transfer platform 400.

A call routed through the call transfer platform 400 may be virtually or electronically routed by the call transfer platform 400 to one or more user phones based on a transfer command or user selection. The switch 406, call transfer logic 408, and call transfer preferences 410 may be circuitry or software modules in various illustrative embodiments. The switch 406 is a control device utilized to connect and disconnect the call path. The switch 406 may be utilized to reroute a call from a first telephonic device to a second telephonic device based on a user selection. Similarly, the switch 406 may switch a call back and forth between any number of devices. As previously described, the call transfer platform is maintained as part of a call path regardless of which phone or communications service provider a call is transferred to. As a result, the switch 406 enables a call transfer based on input at any time. The call transfer logic 408 is the Boolean or digital logic that controls the switch 406. The call transfer logic 408 may send a trigger signal or initiation signal informing the switch 406 how and when to reconfigure the call path and otherwise transfer a call from a first telephone to a second telephone.

The call transfer logic 408 may specify where the call is routed or connected to by the switch 406 based on the transfer command user selection or other user input. The call transfer logic 408 may also control the display or playback of a menu to the user. For example, the call transfer logic 408 may include logic and circuitry for an IVR system indicating how the user may make call transfer selections based on present configurations stored within the call transfer preferences 410. The call transfer logic 408 may also display GUI or other element to a telephone for receiving user input. In one embodiment, the website 412 may allow a user to set preferences or transfer commands within the call transfer preferences 410 which are in turn communicated to the call transfer logic 408.

The call transfer preferences 410 or user preferences is the data and information associating a transfer command with a telephonic device, number, or username. In one embodiment, the call transfer preferences 410 may sequentially list the call transfer commands that may be utilized to transfer a call between any number of phones. The call transfer preferences 410 may be played, displayed, or otherwise, communicated to the user by the call transfer logic 408 as call transfer options based on a request or as needed. The call transfer preferences 410 may be specified based on preset criteria, such as available commands or other information. In another embodiment, the call transfer preferences 410 may be manually selected based on commands that are easily remembered by the user. For example, call transfer commands may be used in place of other commands also frequently used by the communications service provider.

Figure 5:
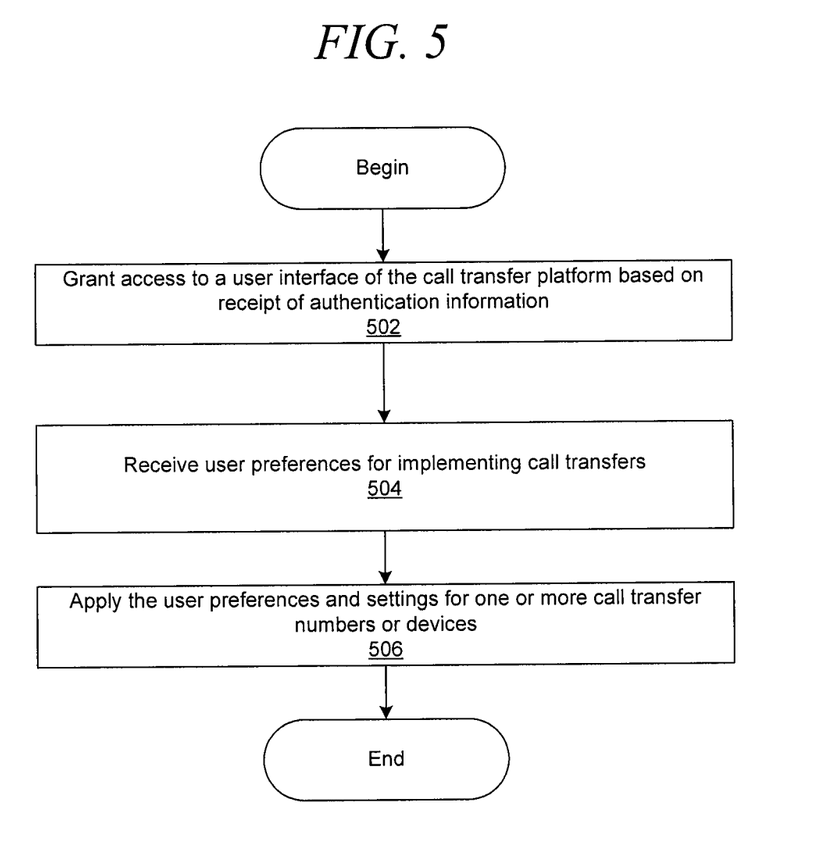
FIG. 5 is a flowchart of a process for configuring call transfer for multiple devices in accordance with an illustrative embodiment.

FIG. 5 is a flowchart of a process for configuring call transfer for multiple devices in accordance with an illustrative embodiment. The process of FIG. 5 may be implemented by a call transfer platform or a server. The process may begin by granting access to a user interface of the call transfer platform based on receipt of authentication information (step 502). The user interface may be a website, application, or other interface configured to grant a user access to the call transfer platform for sending and receiving data and information. The authentication information is information that validates that the user is authorized to access the call transfer platform. The authorization information may include a username, password, account number, or other verifying information.

Next, the call transfer platform receives user preferences for implementing call transfers (step 504). The user preferences may include associating one or more transfer commands with one or more telephone numbers, IP addresses, MAC address, or other similar hardware or software identifier for a device, module, or component enabled for voice communications. The user preferences may include text identifying a name, location, nickname, number or other identifier with each telephonic device. The name may be utilized by a text-to-voice program/IVR to read the call transfer options to a user over the phone before a call transfer selection is made. The user may also indicate the transfer code associated with each telephonic device and whether a delay or re-ring procedure may be utilized as part of a call transfer.

Next, the call transfer platform applies the user preferences and settings for one or more call transfer numbers or devices (step 506). The term telephonic devices or telephone may be utilized herein to generically refer to devices or software that may individually or in combination enable voice communications.

Figure 6:
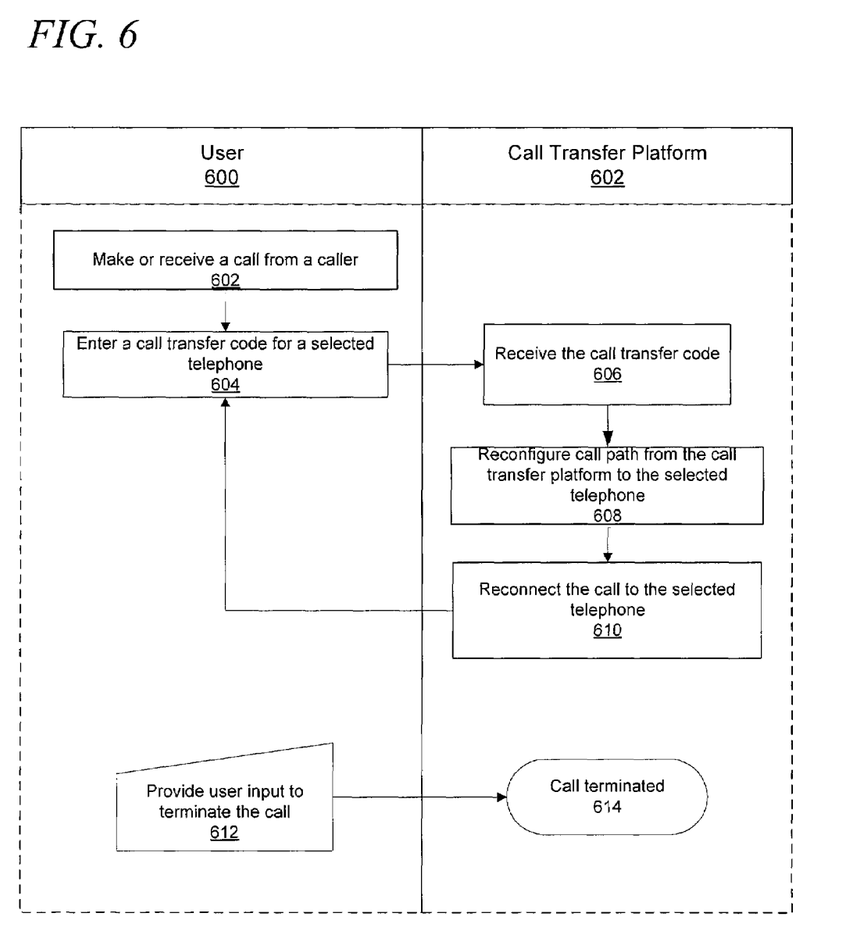
FIG. 6 is a flowchart of a process for implementing a call transfer across multiple devices in accordance with an illustrative embodiment.

FIG. 6 is a flowchart of a process for implementing a call transfer across multiple devices in accordance with an illustrative embodiment. The process of FIG. 6 may be implemented by a user 600 and a call transfer platform 602. The user 602 represents a user utilizing a telephonic device to make and receive voice communications.

The process may begin with the user 600 making or receiving a call with a caller (step 602). Next, the user 600 enters a call transfer code for a selected telephone (step 604). In one embodiment, the user may enter a code, such as *74 to immediately transfer a call from a home VoIP phone to a cell phone. In another embodiment, the user may enter a generic call transfer code, such as *70. Once the generic call transfer code has been entered, the call may be placed on hold by the call transfer platform 602 so that a subsequent transfer code may be entered by the user 600. For example, the call transfer platform 602 may present call transfer options to the user 602. The call transfer platform 602 may utilize an interactive voice response system to indicate what commands need to be entered to transfer the call to any number of specified devices or locations. The voice response system may be read using voice to text translations of text and names pre-selected or otherwise entered by the user 600. In another embodiment, the call transfer platform 602 may present call transfer options utilizing text or information presented on a graphical user interface of the user's phone.

The call transfer platform 602 receives the call transfer code (step 606). The call transfer platform 602 reconfigures a call path from the call transfer platform to the selected telephone (step 608). During step 608, a portion of the call path that was between the call and the user 600 is reconfigured from the call transfer platform 602 or an interconnected communications device to the next selected telephone. As a result, the call transfer platform 602 remains an active part of the call despite the communications service provider or destination of the selected telephone. During steps 606 and 608, the call may be placed on hold. In one embodiment, the call transfer platform 602 may play a message to the caller indicating that the call is being transferred.

Next, the call transfer platform 602 reconnects the call to the selected telephone (step 610). The call is reconnected to the selected device so that the same individual or a different individual may carry on the conversation. The user 600 may subsequently enter a call transfer code for a selected telephone (step 604) to recursively continue the call transfer process through the call transfer platform 602. Each time, the call path is reconfigured from the call transfer platform 602 on to the next selected telephone. At any time, the user 600 may provide user input to terminate the call (step 612) upon which the call is terminated (step 614).

Figure 7:
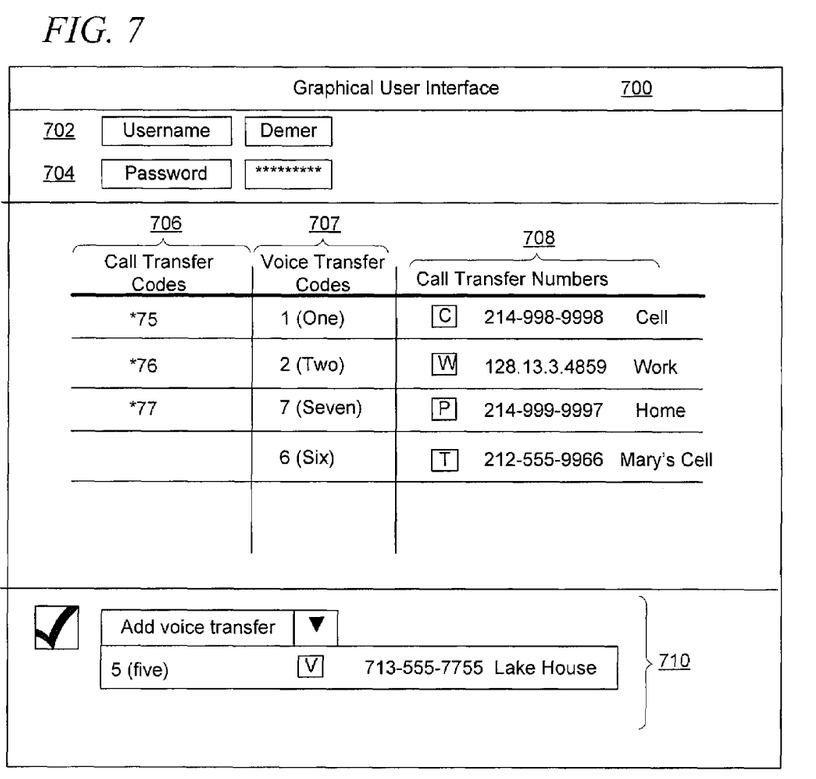
FIG. 7 is a representation of a graphical user interface in accordance with an illustrative embodiment.

FIG. 7 is a representation of a graphical user interface in accordance with an illustrative embodiment. The graphical user interface 700 may include a username 702, password 704, call transfer codes 706, voice transfer codes 707, call transfer numbers 708, and add section 710.

The graphical user interface 700 may be presented through a website or other user interface linked with the call transfer platform. The preferences, information, and data entered in the graphical user interface 700 may be stored locally on a telephone and transmitted to the call transfer platform through a network connection. For example, the user may enter the information using a cell phone or from a laptop using a website provided by the communications service provider.

The username 702 and password 704 may be utilized to authenticate that the user may configure the call transfer preferences and settings. The call transfer codes 706 are the codes that may be utilized to dial the telephonic devices accessible through the call transfer numbers 708. The call transfer codes 706 may be manually set by the user or may be based on available codes designated by the communications service provider. The call transfer numbers 708 represent the numbers, IP addresses, hardware or software identifiers, or dialing, contact, and communication information for the selected telephonic devices. The call transfer numbers 708 may allow a user to specify any amount of information including the number to be used, a phone type, such as home, work, cell, personal, and a name associated with the call transfer numbers 708. In one embodiment, the name may be used by a IVR or test based menu in order to allow the user to select to initiate a call transfer. The call transfer codes 706 and the call transfer numbers 708 may be reconfigured, edited, or deleted at any time based on user input.

The voice transfer codes 707 are the codes that are presented to the user through the IVR or other voice menu. The call transfer codes 706 and the voice transfer codes 707 may be identical or vary. For example, in order to transfer the call to a designated cell phone the user may say one or star seven five once a voice menu is presented to the user based on a general transfer command, such as *99. In another embodiment, the user may also use simplified call transfer codes that correspond to the voice transfer codes 707. For example, by dialing 2 during a call or saying two when presented the voice menu for call transfers, the call is transferred to an IP address or phone number associated with a work phone may be initiated. Any number of numeric and voice commands may be utilized for the voice transfer numbers 708, voice transfer codes, and call transfer numbers 708. As previously described, the names in the call transfer numbers 708 may be utilized to transfer a call. For example, by saying Mary's Cell or Home, voice recognition may be utilized to transfer the call to the designated device or phone number.

The add section 710 allows a user to designate a new transfer code and associate the transfer code with a phone number and name. Any number of call transfer codes may be utilized based on the resources of the communications service providers.

The previous detailed description is of a small number of embodiments for implementing the invention and is not intended to be limiting in scope. The following claims set forth a number of the embodiments of the invention disclosed with greater particularity.

What is claimed as new and desired to be protected by Letters Patent of the United States is:

1. A method for transferring calls between multiple devices, the method comprising:
communicating a call through a call path to a first phone utilizing a first communications service provider, the call path comprising a first switch in communication with a calling phone, a second switch in communication with the first phone, and a call transfer platform separate from and in communication with the first switch and the second switch;

receiving a transfer command from the first phone;

implementing, based on user preferences, a delay or re-ring procedure prior to transferring the call;

transferring the call from the first phone to the second phone, the call being transferred in response to a user selection associated with the second phone;

transferring the call from the second phone to a third phone, the second phone or the third phone utilizing a second communications service provider, the call being transferred in response to a user selection associated with the third phone, wherein the call transfer platform remains in the call path regardless of a destination of a call transfer to allow the call transfer to be implemented a plurality of times and wherein the call path is reconfigured from the call transfer platform through one or more switches to one or more phones for one or more call transfers.

2. The method of claim 1, wherein the call transfer platform is any of a server, router, or switch.

3. The method of claim 1, wherein the call is a plain old telephone service call, voice over internet protocol call, or wireless call.

4. The method according to claim 1, further comprising:
prompting a user to configure one or more transfer commands associated with one or more phones, wherein the one or more transfer commands are the user selections implemented from the one or more phones enabled for communication by one or more communications service providers.

5. The method according to claim 4, wherein the one or more transfer commands are a alphanumeric command or a voice command.

6. The method according to claim 4, wherein the prompting presents a voice menu that audibly indicates the one or more transfer commands required to transfer the call to one or more phones.

7. The method according to claim 1, further comprising:
prompting a user to enter dialing information for another phone.

8. The method according to claim 7, wherein the dialing information is any of a phone number, Internet Protocol address, and username.

9. The method according to claim 1, further comprising:
transferring the call from the third phone to the first phone, the second phone, or one or more other phones based on the user selection associated with a phone to which the call is transferred, wherein the first communications service and the second communications service represent distinct communications service providers.

10. A call transfer platform for transferring calls between devices using one or more communications service providers, the call transfer platform comprising:
links with a plurality of switches separate from the call transfer platform, the plurality of switches comprising a first switch in communication with a calling phone and a second switch in communication with a first phone, wherein the call transfer platform is part of a call path comprising the first switch and the second switch; and
call transfer logic operable to store a plurality of user preferences for transferring calls;
logic to receive a transfer command from the first phone;
logic to implement, based on user preferences, a delay or re-ring procedure prior to transferring the call;
logic to identify, from the user preferences, the phone number of the second phone as being associated with the transfer command, if the transfer command is not a general transfer command; and
logic operable to reconfigure a portion of the call path transfer the call from the first phone to a second phone, in response to the user selection, the user selection being further associated with the second phone, wherein the first phone utilizes a first communications service provider, the second phone utilizes a second communications service provider, the call transfer platform remains in the call path regardless of a destination of a call transfer to allow the call transfer to be implemented a plurality of times.

11. The system according to claim 10, wherein the call transfer logic audibly communicates a voice menu to the user indicating the user preferences, wherein the user preferences specify the devices to which the call may be transferred to continue the call.

12. The system according to claim 10, wherein the call may be transferred between a plurality of phones enabled for communication by the one or more communications service provider based on the user selection associated with each of the plurality of phones.

13. The system according to claim 12, wherein the call transfer platform remains in the call path regardless of a destination of the call transfer for allowing the call transfer to be implemented a plurality of times based on the user selection of one of the plurality of phones.

14. A call transfer platform for transferring calls between multiple devices comprising:
a processor for executing a set of instructions; and
a memory for storing the set of instructions, wherein the set of instructions are configured to:
communicate a call through a first call path to a first phone utilizing a first communications service provider, the call path comprising a first switch in communication with a calling phone, a second switch in communication with the first phone, and the call transfer platform separate from and in communication with the first switch and the second switch;
receive a transfer command from the first phone;
implement, based on user preferences, a delay or re-ring procedure prior to transferring the call;
identify, from user preferences, the phone number of the second phone as being associated with the transfer command, if the transfer command is not a general transfer command; and
transfer the call from the first phone to the second phone using a second communications service provider by rerouting a portion of the call path, in response to a second selection of the user associated with the one or more phones, wherein the call transfer platform remains in the call path regardless of a destination of a call transfer to allow the call transfer to be implemented a plurality of times, and wherein the call path is reconfigured from the call transfer platform through one or more switches to one or more telephones for one or more transfers.

15. The call transfer platform according to claim 14, wherein the plurality of subsequent call transfers are performed utilizing a plurality of communications service providers.

16. The call transfer platform according to claim 14, wherein the set of instructions are configured to visually or audibly display call transfer options to the user.

* * * * *